(12) United States Patent
Wei et al.

(10) Patent No.: US 7,121,723 B2
(45) Date of Patent: Oct. 17, 2006

(54) LINEAR GUIDE APPARATUS

(75) Inventors: Xu Wei, Kanagawa (JP); Masaru Akiyama, Kanagawa (JP)

(73) Assignee: NSK Ltd., Tokyo (JP)

( * ) Notice: Subject to any disclaimer, the term of this patent is extended or adjusted under 35 U.S.C. 154(b) by 149 days.

(21) Appl. No.: 10/821,894

(22) Filed: Apr. 12, 2004

(65) Prior Publication Data

US 2004/0202389 A1    Oct. 14, 2004

(30) Foreign Application Priority Data

Apr. 11, 2003 (JP) ............................ P2003-108231
Sep. 24, 2003 (JP) ............................ P2003-331452
Nov. 28, 2003 (JP) ............................ P2003-400151

(51) Int. Cl.
*F16C 29/06* (2006.01)

(52) U.S. Cl. .................................................. 384/45

(58) Field of Classification Search ................. 384/44, 384/45, 43; 464/168
See application file for complete search history.

(56) References Cited

U.S. PATENT DOCUMENTS 5,800,064 A * 9/1998 Ohya ........................... 384/44

FOREIGN PATENT DOCUMENTS

JP         5-209618 A      8/1993
JP       2002-139035 A     5/2002

* cited by examiner

*Primary Examiner*—Lenard A. Footland
(74) *Attorney, Agent, or Firm*—Sughrue Mion, PLLC

(57) ABSTRACT

A linear guide apparatus is provided with two (upper and lower) tracks of rolling element race tracks formed on a guide rail and of rolling element race tracks formed on a slider main body so as to oppose the rolling element race tracks on the respective sides, i.e., four tracks of race tracks in total. A recess is provided below the lower rolling element race track on the slider main body and the end cap fixed to an end face of the slider main body is provided with a projection that engages with the recess so as to determine a position of the end cap.

5 Claims, 15 Drawing Sheets

ND GUIDE APPARATUS

LINEAR GUIDE APPARATUS

BACKGROUND OF THE INVENTION

1. Field of the Invention

The present invention relates to a linear guide apparatus.

The present invention also relates to a linear guide apparatus provided with rollers as a rolling element.

2. Description of the Related Art

FIG. 22 shows an example of a related-art linear guide apparatus, which is provided with a guide rail 1 extending in an axial direction and a slider 2 mounted over the guide rail 1 so as to relatively move with respect thereto along the axial direction.

The guide rail 1 is provided with two (upper and lower) tracks of rolling element rolling grooves 3 axially extending on the respective side faces thereof, i.e., four tracks of rolling grooves in total. The slider 2 is separated into a slider main body 2A and end caps 5 in an axial motion direction, in such a manner that the end caps 5 are disposed on end portions of the slider main body 2A in the axial motion direction. The slider main body 2A includes leg portions 4 disposed widthwise over both sides of the guide rail 1, and a horizontal portion 7 connecting the leg portions 4. The horizontal portion 7 is mounted on an end face (an upper face of the guide rail 1 in the drawing) in a thicknesswise direction of the guide rail 1 (a direction perpendicular to both a longitudinal direction and a widthwise direction). The slider main body 2A is provided with rolling element rolling grooves 31 along an inner face of the respective leg portions 4 so as to oppose the rolling element rolling grooves 3 so that the rolling element rolling grooves 3, 31 constitute rolling passages for balls B.

A plurality of balls B serving as rolling elements is rollably disposed between the opposing rolling element rolling grooves 3 and 31, so that the slider 2 can relatively move with respect to the guide rail 1 in the axial direction via the rolling motion of the balls B.

Due to sliding motion of the slider 2, the balls B disposed between the guide rail 1 and the slider 2 roll toward an end portion of the slider 2; therefore the balls B are required to endlessly circulate in order that the slider 2 can continue the axial motion.

Accordingly, the slider main body 2A includes two (upper and lower) return passages 8 axially penetrating through the respective leg portions 4 of the slider main body 2A, i.e., 4 return passages in total, and each of end caps 5 includes semi-arc shaped direction reversal paths 6 so as to communicate with the rolling passages formed by the rolling element rolling grooves 3 and 31 and the return passages 8. The end caps 5 are fixed to front and rear end faces in the axial motion direction of the slider main body 2A with screws 12 or the like, thereby constituting endless circulation passages for the rolling elements with the rolling passages and the return passages 8 and the direction reversal paths 6. Furthermore, referring to FIG. 22 the reference numeral 10 denotes a tapped hole for fixing the end cap 5 to the end face of the slider main body 2A with screws, 11 a side seal, and 13 a greasing nipple disposed on a side or end face of the end cap 5.

It is essential, for ensuring smooth circulation of the balls B when fixing the end cap 5 to the end face of the slider main body 2A, to correctly align the direction reversal paths 6 of the end cap 5 with the respective rolling element rolling grooves 3 and 31, as well as with there turn passages 8. Therefore, in related-art, a positioning groove 32 is simultaneously formed by grinding when forming the rolling element rolling grooves 31 on the slider main body 2A, along the axial direction parallelly between the upper and lower rolling element rolling grooves 31 as shown in FIG. 23 and FIG. 24. A projection 33 is formed on the end cap 5, which is to be engaged with the positioning groove 32 as shown in FIG. 25, so that the end cap 5 can be located in position by fitting the projection 33 into the positioning groove 32. (Japanese Published Unexamined Patent Application No. 2002-139035)

In the foregoing related-art linear guide apparatus, in case where an aperture deformation of the slider main body 2A because of a mounting operation of the slider 2 on the guide rail 1 and/or deformation due to heat treatment occur, generally the slider main body 2A, which has a C-shaped cross-section, is deformed in such a manner that the leg portions 4 open outwardly in the widthwise direction with respect to a center of rotation set at a center of the upper face of the slider main body 2A, and the aperture between the leg portions 4 becomes greater at a portion closer to end portions thereof.

Therefore, when engagement of the end cap 5 with the slider main body 2A is achieved at the positioning grooves 32 formed between the upper and lower rolling element rolling grooves 31 on the slider main body 2A as described above, since the lower rolling element rolling grooves 31 are provided below the positioning grooves 32 on the leg portions 4, deformation of a portion of the end cap 5 lower than the positioning grooves may not follow the deformation of the slider main body 2A. Therefore, positioning precision between the lower rolling element rolling grooves 31 on the slider main body 2A, which has made greater deformation, and the direction reversal paths 6 is degraded, thereby affecting circulation of the balls B.

In a linear guide apparatus provided with rollers as a rolling element, as disclosed in Japanese Published Unexamined Patent Application No. Hei. 5-209618, an overall length of a guide member 49 for guiding rollers 46 in an axial direction of a guide rail is made longer than an overall length of a slider main body 42, and end portions of the guide member 49 are inserted in engaging holes 48 formed on end caps 43a, 43b so that the end caps 43a, 43b are located in place with respect to the slider main body 42, as shown in FIG. 26.

In the linear guide apparatus disclosed in the above-mentioned document, since the position of the end caps 43a, 43b is determined via the guide member 49, as long as a size error of the guide member 49 or a positioning error in attaching the guide member 49 to the slider main body 42 is sufficiently small a problem will not arise. However, in a case where the size error or the positioning error becomes greater, the positioning precision of the end cap is deteriorated. Further, the structure disclosed in the above-mentioned document requires a bolt for fixing the guide member to the slider, which results in an increase in the number of components and assembly steps.

SUMMARY OF THE INVENTION

An object of the present invention is to provide a linear guide apparatus having higher positioning precision between the rolling element race tracks on the slider main body and the direction reversal path in the end cap, so as to ensure smooth circulation of the rolling elements and thus to improve operational efficiency.

Another object of the present invention is to provide a linear guide apparatus capable of smoothly circulating rollers irrespective of the size error of the guide member or a similar factor.

For achieving the foregoing object, a first aspect of the present invention provides a linear guide apparatus comprising:

a guide rail having a plurality of rolling element race tracks provided on each of side faces of the guide rail; and a slider having leg portions disposed widthwise over both sides of the guide rail and a horizontal portion connecting the leg portions, the slider including a slider main body and a pair of end caps respectively fixed to end faces of the slider main body, the slider main body having a plurality of rolling element race tracks, which are provided on an inner face of the respective leg portions of the slider main body so that both of the rolling element race tracks of the guide rail and the slider main body form rolling passages, and a plurality of return passages axially penetrating through the slider main body, the end caps each having a plurality of direction reversal paths communicating with the respective rolling passages and return passages of the slider main body, wherein the slider main body has first recesses each of which provided below the rolling element race track close to an end portion of each of the leg portions, and each of the end caps has first projections each of which engages with the first recess so as to determine a position of the end cap. Preferably, the slider main body may have two rolling element race tracks and two return passages on each of the leg portions.

A second aspect of the present invention provides the linear guide apparatus according to the first aspect, wherein the first recess is formed by axially grinding simultaneously with the rolling element race tracks on the slider main body.

According to the present invention the positioning precision between the upper and lower rolling element race tracks on the slider main body and the direction reversal paths in the end cap can be improved; therefore smooth circulation of the rolling element is ensured and operational efficiency can be thereby improved.

Further, a third aspect of the present invention provides the linear guide apparatus according to the first aspect, wherein each of the end caps has second projections each having a face to be in contact with an inner face at a base end portion of each of the leg portions of the slider main body.

In the linear guide apparatus according to the present invention, the positioning of the slider main body and the end caps is achieved at the end portion and base end portion of the respective leg portions of the slider main body.

Since an end portion of the leg portions of the slider main body is where deformation is largest, performing the positioning at such a point can prevent misalignment between the return passages and rolling passages formed in the respective leg portions (the rolling passage constituted of the rolling element race track provided on the respective leg portions and the rolling element race track provided on the guide rail) and the direction reversal path in the end cap.

Also, the slider main body and the end caps are normally combined by engagement of a bolt through a hole in the end cap with a female thread provided in the slider main body Accordingly, because of the recess formed on the slider main body, a force is applied in a direction to incline the leg portion around the recess when fastening the bolt. Such force can cause misalignment of the slider main body and the end cap around a base end portion of the leg portions, however, according to the present invention, positioning is also performed at a base end portion of the leg portions of the slider, thereby effectively preventing misalignment at this position.

According to the present invention, in the linear guide apparatus provided with the slider having a plurality of circulation passages in the respective leg portions thereof, positioning of the slider main body and the end cap can be accurately performed regardless of a large deformation of the slider main body, so that smooth rolling motion passages can be constituted. Consequently, smooth circulation of the rolling element is achieved through all of the circulation passages and excellent operational efficiency of the linear guide apparatus can be thereby secured.

Moreover, a fourth aspect of the present invention provides a linear guide apparatus comprising:

a guide rail having a rolling element race track provided on each of side faces of the guide rail;

a slider having a slider main body and a pair of end caps fixed to end faces of the slider main body, the slider main body having a rolling element race track provided on each of inner faces of the slider main body so as to opposite the rolling element race track of the guide rail;

a guide member for guiding a plurality of rollers disposed between the rolling element race track of the guide rail and the rolling element race track of the slider main body in an axial direction of the guide rail;

a positioning section formed on the inner face of the slider main body for placing the guide member at a predetermined position; and a positioning projection formed on each of the end caps, to be engaged with the positioning section of the slider main body, for placing the end caps provided on the end faces of the slider main body at a predetermined position.

Since such a construction permits direct positioning of the end cap with respect to the slider regardless of the a large size error of the guide member or positioning error of the guide member to the slider, the positioning precision can be improved and resultantly smooth circulation of the rollers can be ensured irrespective of a size error of the guide member or a similar factor.

A fifth aspect of the present invention provides the linear guide apparatus according to the fourth aspect, further comprising:

an engaging bore or an engaging projection formed at a tip portion of the positioning projection of the end cap; and a projection to be engaged with the engaging bore or a bore to be engaged with the engaging projection, formed on the guide member.

Since such a construction permits fixing the guide member in the positioning groove on the slider without using a bolt or the like, the number of components and assembly steps can be reduced.

A sixth aspect of the present invention provides the linear guide apparatus according to the first or the fifth aspect, wherein the end cap comprises an end cap main body having an outer direction reversal face for reversing a direction of the rollers, and a return guide having an inner direction reversal face opposing the outer direction reversal face on the end cap main body, and wherein the positioning projection is formed on the end cap main body.

Since such a construction achieves precise parallelism between a tip portion on the rolling element race track side of the outer direction reversal face (scooping section) and a surface of the rolling element race track at a cross-section orthogonal to a moving direction of the rollers, which is critical in the circulation of the rollers, the rollers can circulate more smoothly.

A seventh aspect of the present invention provides the linear guide apparatus according to any one of the first to the sixth aspects, wherein the rolling element race track and the positioning section formed on the inner face of the slider main body are simultaneously ground and finished by a single grinder.

An eighth aspect of the present invention provides a linear guide apparatus comprising:
- a guide rail having a rolling element race track provided on each of side faces of the guide rail;
- a slider having a slider main body and a pair of end caps fixed to end faces of the slider main body, the slider main body having a rolling element race track provided on each of inner faces of the slider main body so as to oppose the rolling element race track of the guide rail; and
- a plurality of rollers disposed between the rolling element race track of the guide rail and the rolling element race track of the slider main body,
- wherein the slider main body comprises a positioning section formed on the inner face of the slider main body in parallel with the rolling element race track provided on the slider main body, and each of the end caps comprises a positioning projection to be engaged with the positioning section for placing the end cap placed on the end faces of the slider main body at a predetermined position.

Referring to the linear guide apparatus according to the first and the eighth aspects of the present invention, since the end cap can be accurately positioned with respect to the slider regardless of the large size error of the guide member or positioning error of the guide member to the slider, smooth circulation of the rollers can be ensured irrespective of the size error of the guide member or a similar factor.

Referring to the linear guide apparatus according to the fifth aspect of the present invention, since the guide member can be fixed in the positioning section without using a bolt or the like, the number of components and assembly steps can be reduced in addition to the foregoing effect.

Referring to the linear guide apparatus according to the sixth aspect of the present invention, since precise parallelism can be achieved at a cross-section orthogonal to a moving direction of the rollers, the rollers can circulate more smoothly in addition to the foregoing effect.

Referring to the linear guide apparatus according to the seventh aspect of the present invention, the positioning section can be processed easily but at high precision, and processing time required for the grinding operation can be reduced because of the simultaneous processing.

DETAILED DESCRIPTION OF THE INVENTION

Referring to the accompanying drawings, embodiments of the present invention will be described hereinunder.

Figure 1:
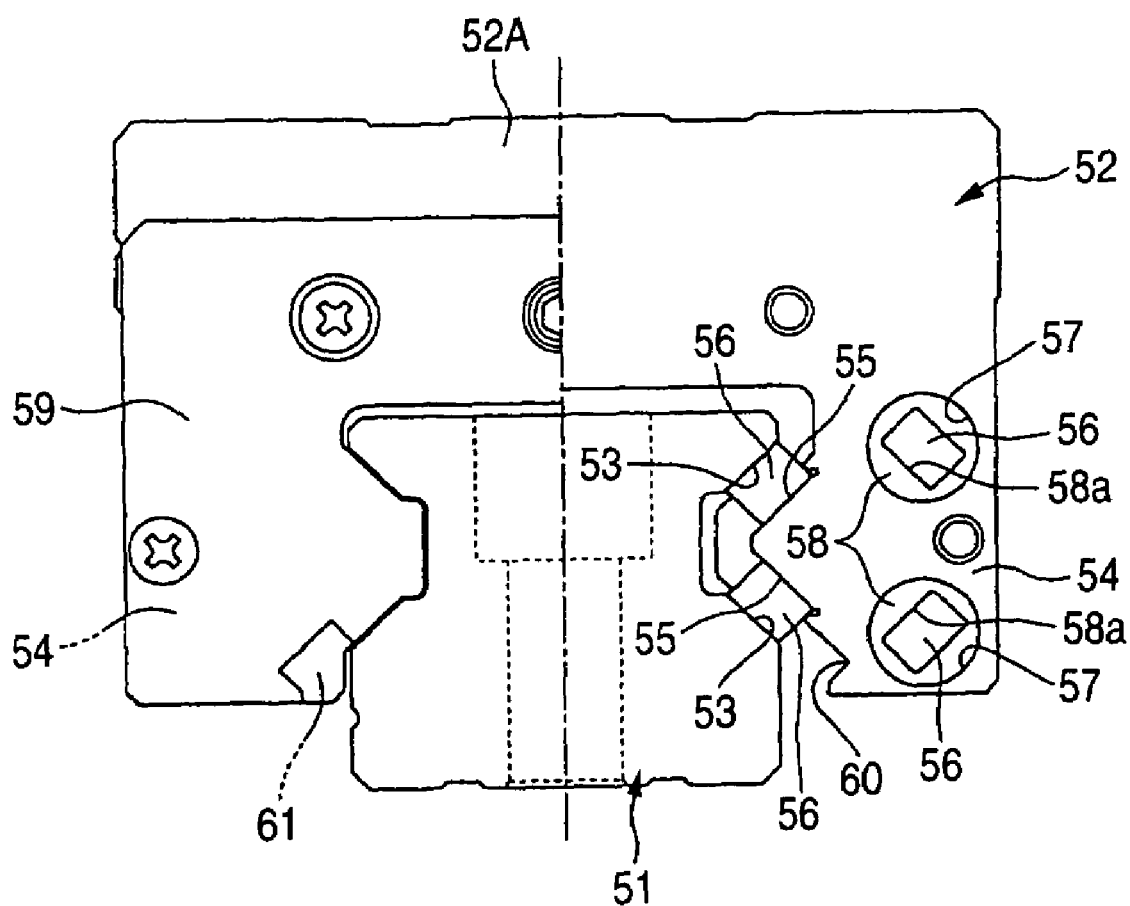
FIG. 1 is a partially cut away front view showing a structure of a linear guide apparatus according to a first embodiment of the present invention.
Figure 2:
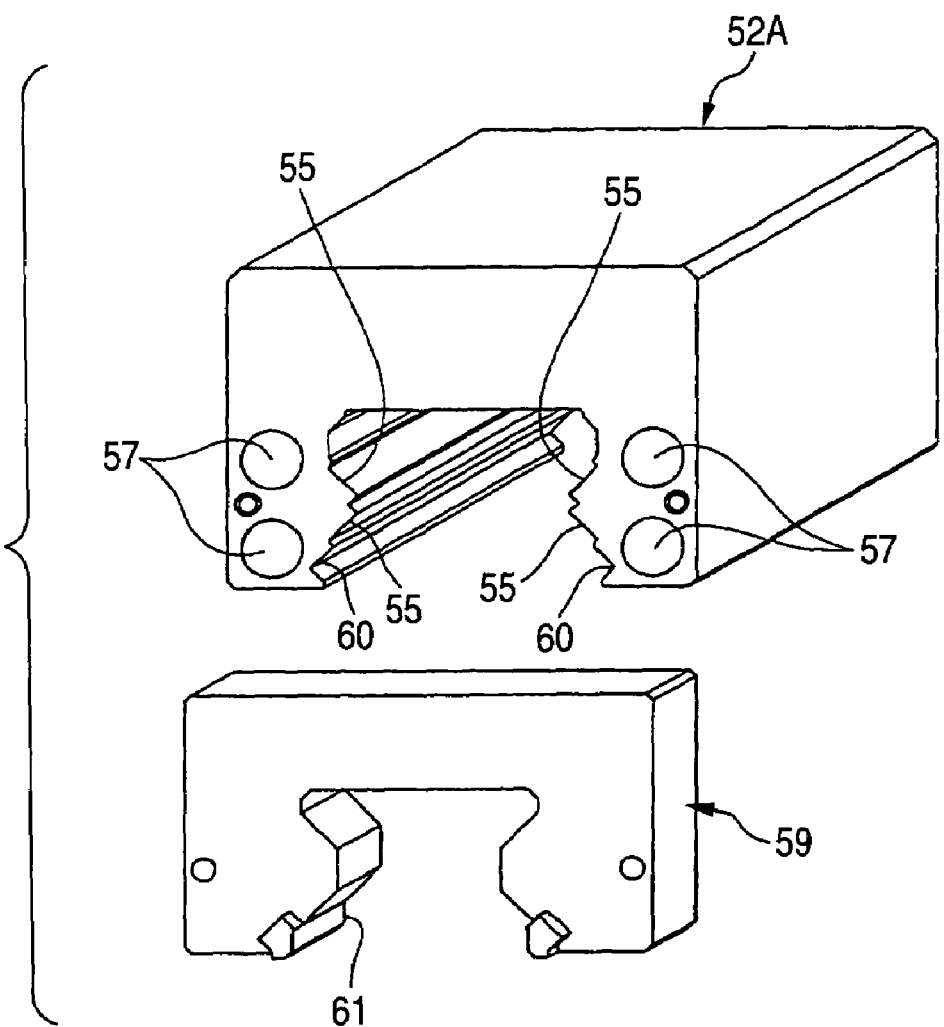
FIG. 2 is an exploded perspective view showing a slider main body and an end cap.
Figure 3:
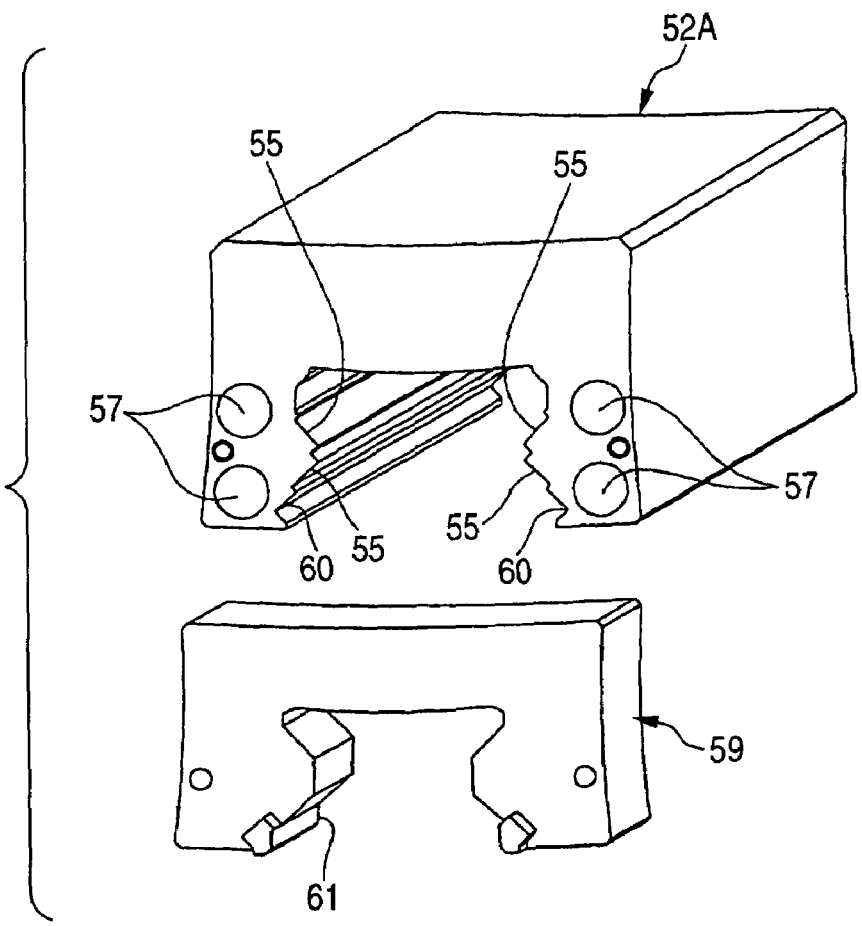
FIG. 3 is an exploded perspective view showing the slider main body and the end cap for explaining deformation thereof.
Figure 4:
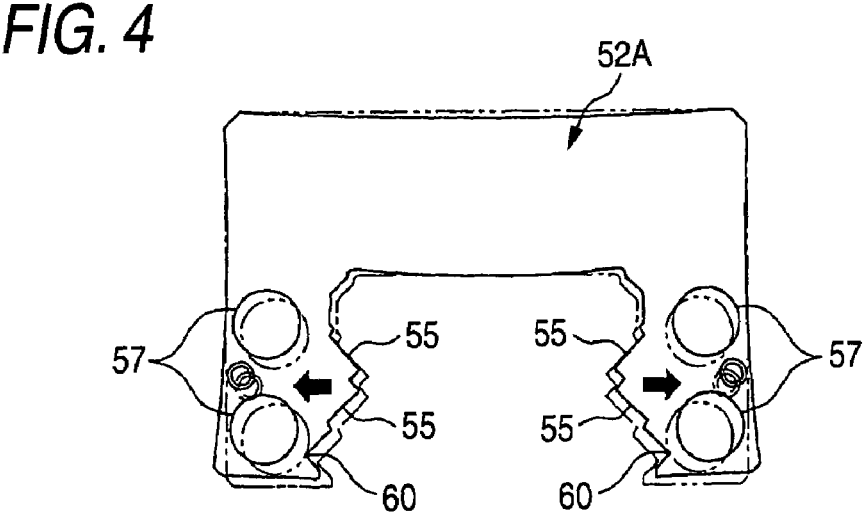
FIG. 4 is a view showing the slider main body for explaining deformation thereof.

FIG. 1 is a partially cut away view of a linear guide apparatus according to a first embodiment of the present invention. FIG. 2 is an exploded perspective view showing a slider main body and an end cap. FIG. 3 is an exploded perspective view showing the slider main body and the end cap for explaining deformation thereof. FIG. 4 is a view showing the slider main body for explaining deformation thereof.

Referring to FIG. 1, a linear guide apparatus 50 according to the first embodiment of the present invention is provided with a guide rail 51 extending in an axial direction, and a slider 52 mounted over the guide rail 51 so as to relatively move with respect thereto in the axial direction.

The guide rail 51 is provided with two (upper and lower) tracks of rolling element race tracks 53 axially extending on the respective side faces thereof i.e., four tracks of race tracks in total. A slider main body 52A of the slider 52 is provided with rolling element race tracks 55 along an inner face of the respective leg portions 54 so as to oppose the rolling element race tracks 53 so that the rolling element race tracks 53, 55 constitute rolling passages for rollers 56.

A plurality of rollers 56 serving as rolling elements is rollably disposed between the rolling element race tracks 53 and 55, so that the slider 52 can relatively move with respect thereto the guide rail 51 in the axial direction via rolling motion of the rollers 56. Due to sliding motion of the slider 52, the rollers 56 disposed between the guide rail 51 and the slider 52 roll toward an axial end portion of the slider 52; therefore the rollers 56 are required to endlessly circulate in order that the slider 52 can continue an axial motion.

Accordingly, the slider main body 52A is provided with two (upper and lower) through holes 57 having a circular cross-section axially penetrating through the respective leg portions 54 of the slider main body 52A, i.e., 4 holes in total, and circulation tubes 58 are inserted into the respective through holes 57. A hole having a rectangular cross-section is formed in the circulation tube 58 so as to fit rollers 56; therefore the hole of the rectangular cross-section serves as are turn passage for the rollers 56. A pair of end caps 59 serving as a rolling element circulating section have semi-arc shaped direction reversal paths (not shown) so as to communicate with the rolling passage formed by the rolling element race tracks 53 and 55 and the return passages 58a. The end caps 59 are fixed to front and rear end faces in an axial motion direction of the slider main body 52A with screws or the like, thereby constituting endless circulation passages for the rollers 56.

Meanwhile, since rollers 56 are employed as the rolling elements in the first embodiment, the direction reversal paths provided in the end cap 59 includes one communicating with the upper return passage 58a and the lower rolling element race tracks 53 and 55, and the other communicating with the lower return passage 58a and the upper rolling element race tracks 53 and 55.

Now as shown in FIG. 1 and FIG. 2, in the first embodiment, a positioning groove (recess) 60 having a V-shaped cross-section is axially formed parallelly below the lower rolling element race track 55 on the slider main body 52A by grinding simultaneously with the rolling element race tracks 55. A V-shaped projection 61 that can engage with the positioning groove 60 is formed on the end cap 59. Therefore, the end cap 59 can be located in position by the engagement of the projection 61 with the positioning groove 60, thereby achieving alignment of the rolling element race tracks 53 and 55 and the return passages 58a with the direction reversal paths in the end cap 59.

In the above first embodiment, since the positioning groove 60, with which the projection 61 of the end cap 59 is to be engaged, is provided below the lower rolling element race track 55 on the slider main body 52A, in case where an aperture deformation of the slider main body 52A because of a mounting operation of the slider 52 on the guide rail 51 and/or deformation due to heat treatment occur, by which the slider main body 52A having a C-shaped cross-section deforms in such a manner that the leg portions 54 open outwardly in a widthwise direction with respect to a center of rotation set at a center of the upper face of the slider main body 52A as shown in FIGS. 3 and 4, the end cap 59 deforms so as to follow the deformation of a lower portion of the leg portion 54 of the slider main body 52A. Accordingly, it is preferable to form the end cap 59 such that a portion thereof corresponding to the leg portion 54 can slightly open outwardly in the widthwise direction, taking into account the possible deformation of the leg portion 54 of the slider main body 52A.

As a result, positioning precision between the upper and lower rolling element race tracks 55 on the slider main body 52A and the direction reversal path in the end cap 59 can be improved, and consequently smooth circulation of the rollers 56 is ensured and operational efficiency can be thereby improved.

Now, a second embodiment of the present invention will be described hereinunder.

Figure 5A:
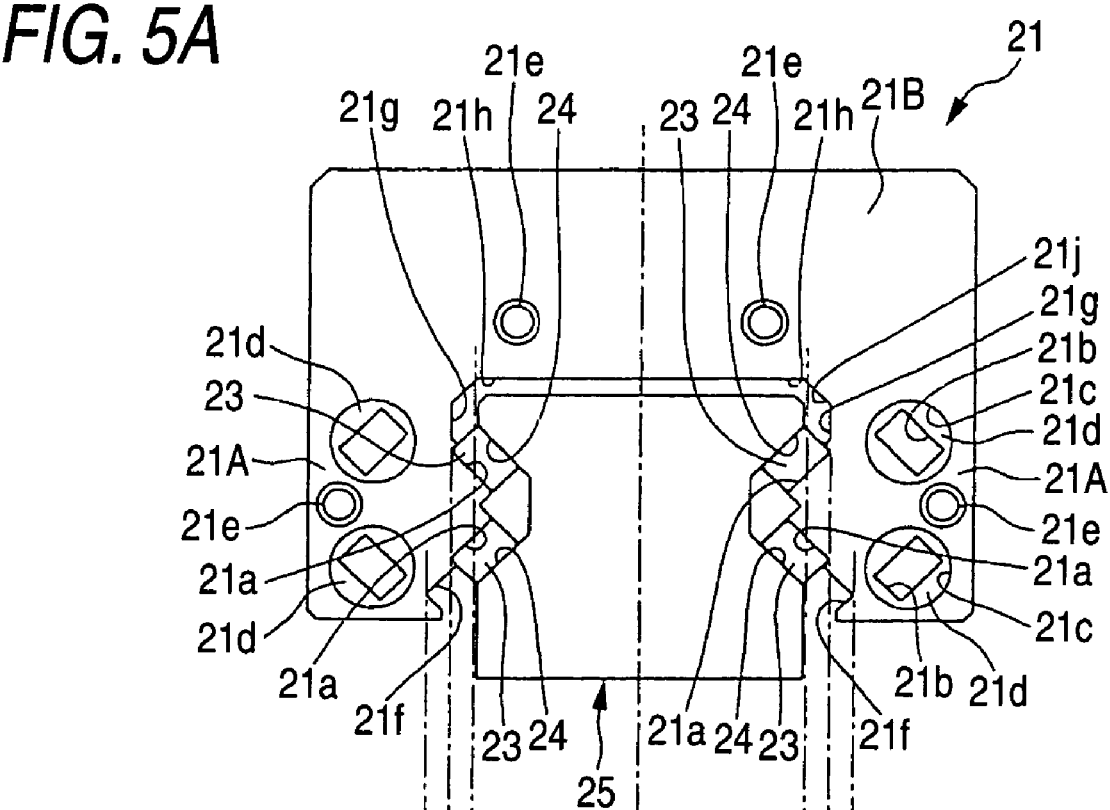
FIGS. 5A and 5B are views for explaining a linear guide apparatus according to a second embodiment of the present invention, FIG. 5A being a front view showing a slider main body of the linear guide apparatus, without an end cap, and FIG. 5B being a front view showing a face of the end cap that opposes the slider main body.
Figure 5B:
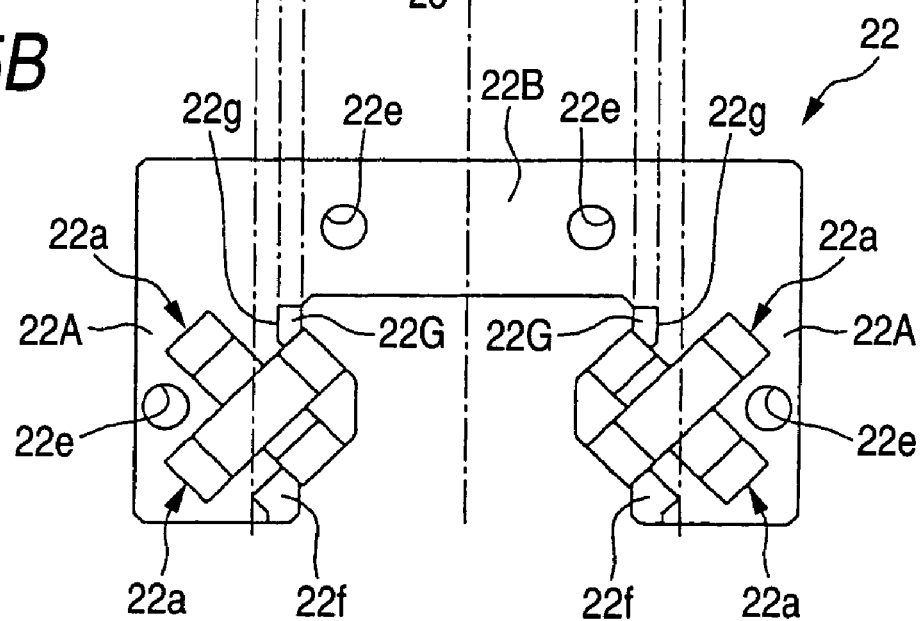

Referring to FIG. 5, a structure of the linear guide apparatus according to the second embodiment will be described. FIG. 5A is a front view showing a slider main body of the linear guide apparatus, without an end cap. FIG. 5B is a front view showing a face of the end cap that opposes the slider main body.

The linear guide apparatus is provided with a guide rail 25, a slider including a slider main body 21 and end caps 22, and a plurality of rollers (rolling elements) 23. The guide rail 25 is provided with two tracks of rolling element race tracks 24 parallelly extending in an axial direction on the respective side faces thereof. The slider main body 21 is provided with rolling element race tracks 21a on an inner face of respective leg portions 21A so as to oppose the rolling element race tracks 24 on the guide rail 25. These rolling element race tracks 24, 21a constitute rolling passages for the rollers 23.

The slider main body 21 is provided with two (upper and lower) through hole 21c having a circular cross-section axially penetrating through the respective leg portions 21A of the slider main body 21, i.e., 4 holes in total, and circulation tubes 21d made of a synthetic resin are inserted into the respective through holes 21c. A hole having a rectangular cross-section is formed in the circulation tube 21d so as to fit the rollers 23; therefore the hole of the rectangular cross-section serves as a return passage 21b for the rollers 23. Female threads 21e are formed between the two return passages 21b in the respective leg portions 21A and in a horizontal portion 21B, so that a tip portion of a bolt is engaged therewith when attaching the end cap 22.

In a leg portion 22A of the end cap 22, two direction reversal paths 22a are provided so as to form a grade separation at an angle of 90 degrees. Therefore, via one of the direction reversal paths 22a, the rolling passage formed by the rolling element race tracks 11, 21a closer to a base end portion (end portion on the side of the horizontal portion 22B) of the leg portion 22A and the return passage 21b closer to an end portion (end portion opposite to the horizontal portion 22B) of the leg portion 22A are connected, so that these paths constitute an endless circulation passage through which the rollers 23 can endlessly circulate.

Likewise, via the other direction reversal paths 22a, the rolling passage formed by the rolling element race tracks 11, 21a closer to the end portion of the leg portion 22A and the return passage 21b closer to the base end portion of the leg portion 22A are connected, so that these paths constitute an endless circulation passage through which the rollers 3 can endlessly circulate. The end cap 22 is also provided with through holes 22e to communicate with the female thread 21e in the slider main body 21, formed at the respective corresponding positions.

As a positioning reference between the slider main body 21 and the end cap 22, a positioning groove (recess) 21f having a V-shaped cross-section is formed on an inner face of an end portion of the respective leg portions 21A of the slider 21, and a V-shaped projection (first projection) 22f to be fitted with the positioning groove 21f is formed on a face of the end cap 22 opposing the slider main body 21. On the face of the end cap 22 opposing the slider main body 21, another projection (second projection) 22G is also provided. The projection 22G has a face 22g to be in contact with an inner face (flat surface) 21g at a base end portion of the respective leg portions 21A of the slider main body 21.

The positioning groove 21f and the inner face (flat surface) 21g are simultaneously formed with the rolling element race track 21a by grinding on the slider main body 21 made of a metal. The first and second projections 22f, 22G are injection-molded in an integral body with the end cap 22 when injection-molding the end cap 22 from a synthetic resin, utilizing a mold provided with a recess corresponding to each of the projections.

Then, when attaching the end caps 22 to the end portions of the slider main body 21 in the axial motion direction, first the projection (first projection) 22f on the end cap 22 is fitted with the positioning groove 21f on the slider main body 21, and then the face 22g of the projection (second projection) 22G on the end cap 22 is placed in contact with the inner face (flat surface) 21g on the slider main body 0.21, to thereby achieve the positioning. Thereafter, a bolt is inserted through the hole 22e to be engaged with the female thread 21e, thus to combine the slider main body 21 and the end cap 22.

Through such a process, the slider main body 21 and the end cap 22 are combined achieving the positioning at the end portion and the base end portion of the respective leg portions. In other words, in the linear guide apparatus according to the second embodiment, the positioning is achieved both at the end portion of the leg portions of the slider main body where deformation is largest and at the base end portion of the leg portions of the slider main body where a position shift is easy to occur when fastening the bolt.

Consequently, by employing the linear guide apparatus according to the second embodiment, positioning of the slider main body 21 and the end cap 22 can be accurately performed regardless of a large deformation of the slider main body, so that smooth circulation passages can be formed. As a result, smooth rolling motion of the rolling element is achieved through all of the circulation passages and excellent operational efficiency of the linear guide apparatus can be thereby secured.

Further, it is preferable to slightly shift a position of the projections 22f, 22G outwardly in a widthwise direction so that the positioning of the slider main body 21 and the end cap 22 is achieved with the projections 22f, 22G on the end cap 22 elastically deformed, because in this way the positioning can be securely achieved even when the slider main body 21 is deformed.

Furthermore, in the second embodiment, while the second projection 22G formed on the end cap 22 is provided with the face 22g to make contact with the inner face 21g at the base end portion of the leg portion 21A of the slider main body 21, it is also preferable to provide, instead of or in addition to the face 22g, a face which makes contact with a face 21h on the horizontal portion 21B in the proximity of the inner face 21g or a face 21j on a corner between the inner face 21g and the face 21h. FIG. 5A includes the numerals indicating these faces.

It is to be understood that the linear guide apparatus according to the present invention is not limited to the foregoing first and second embodiments, and that various modifications can be made without departing from the spirit and scope of the present invention.

For example, in the above-mentioned first and second embodiments, the positioning groove 60, 21f and the projection 61, 22f are of a V-shape, however, the shape of these parts is not specifically limited and may be modified appropriately.

Still further, while the first and second embodiments refer to a linear guide apparatus provided with two tracks of the rolling element race tracks in the respective leg portions in which rollers are employed as the rolling element, a linear guide apparatus according to the present invention is not limited to such a constitution but includes a linear guide apparatus in which balls are employed as the rolling element or which is provided with three tracks or more of the rolling element race tracks in the respective leg portions.

Figure 6:
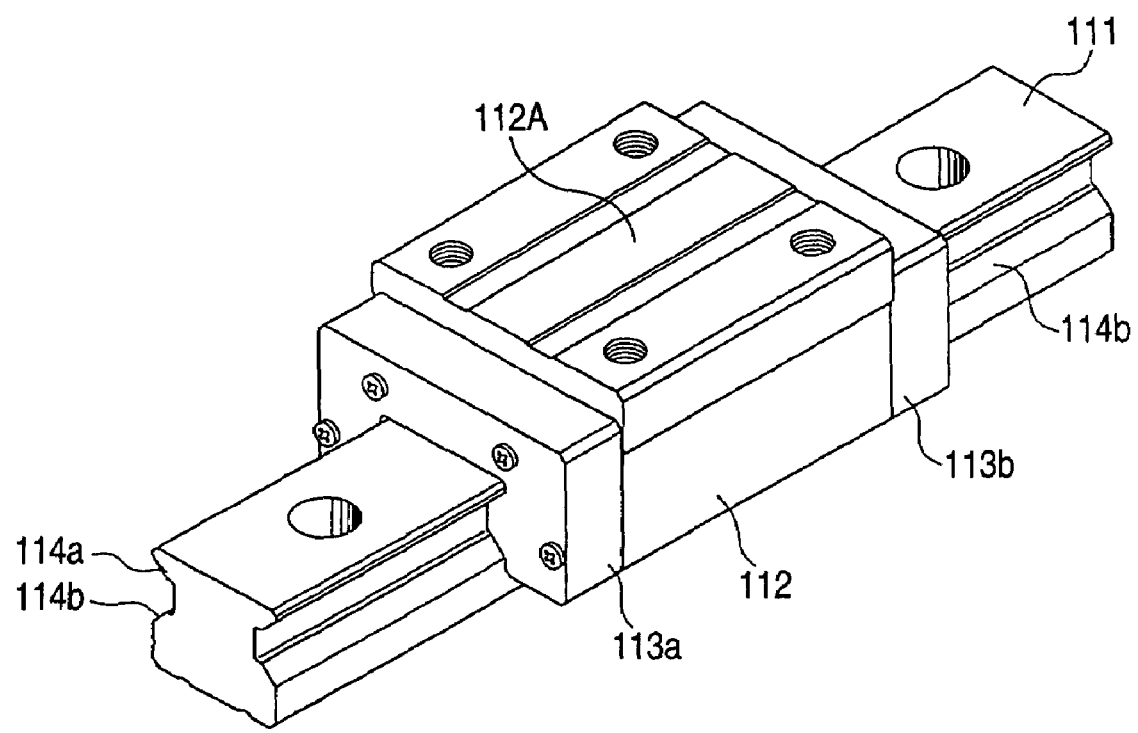
FIG. 6 is a perspective view showing a linear guide apparatus according to a third embodiment of the present invention.
Figure 7:
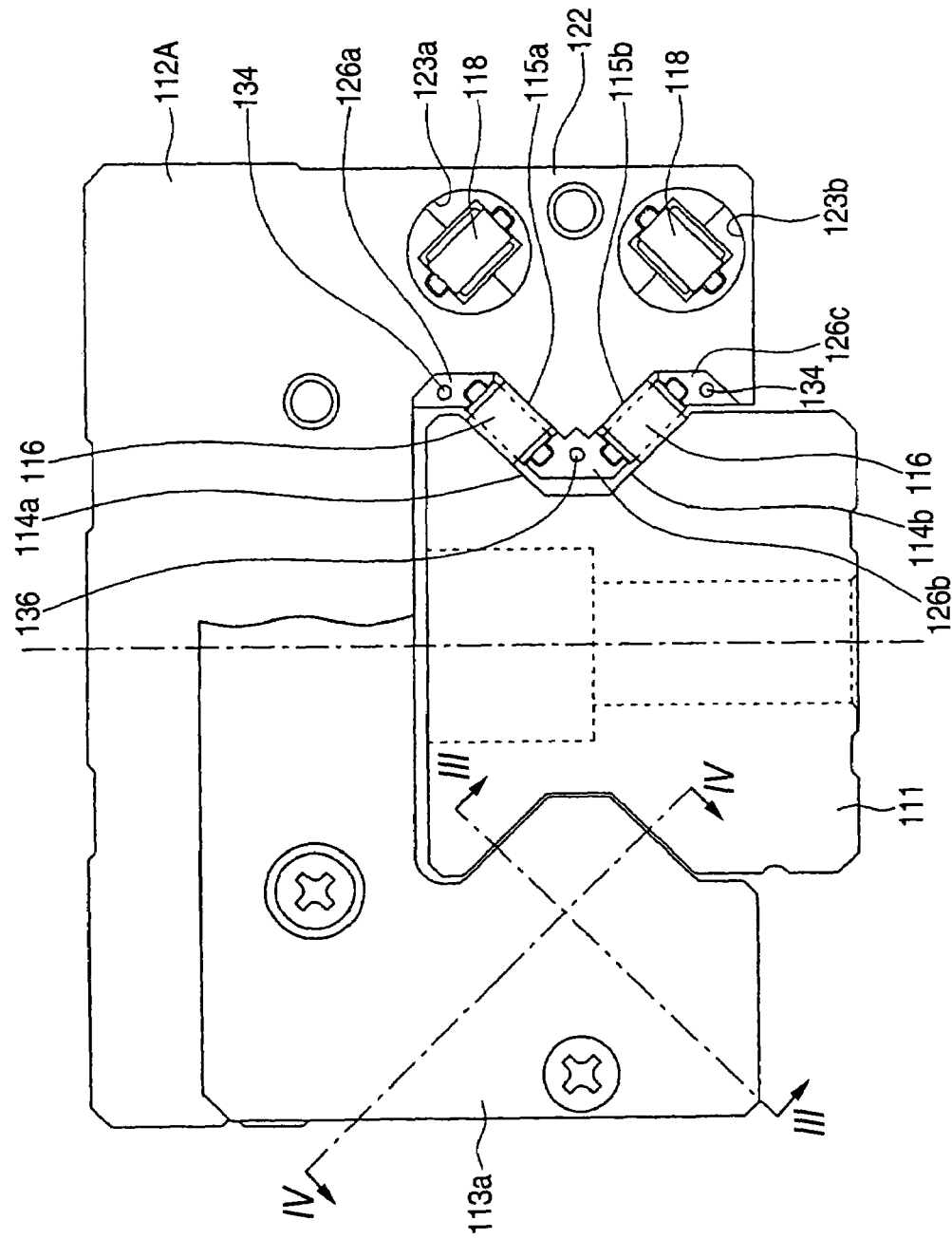
FIG. 7 is a front view showing the linear guide apparatus of FIG. 6.

Next, a third embodiment of the present invention will be described hereinunder. FIG. 6 through FIG. 16 represent a liner guide apparatus according to the third embodiment of the present invention. In FIG. 6 and FIG. 7, the linear guide apparatus according to the third embodiment of the present invention is provided with a guide rail 111, and a slider 112 which relatively moves with respect to the guide rail 111 in an axial direction of the guide rail 111. The slider 112 includes a slider main body 112A and a pair of end caps 113a, 113b attached on the respective front and rear end faces in an axial motion direction of the slider main body 112A of the slider 112. Rolling element race tracks 114a, 114b with flat surface are formed in the axial direction of the guide rail ill on the respective side faces of the guide rail 111.

The rolling element race tracks 114a, 114b are obliquely formed with respect to a side face of the guide rail 111 in such a manner that the oblique surfaces are orthogonal with each other. Also, the rolling element race tracks 114a, 114b are respectively opposing rolling element race tracks 115a, 115b with flat surface (see FIG. 7) formed on an inner face of the slider main body 112A. A plurality of rollers which serve as the rolling element 116 are disposed between the rolling element race tracks 114a, 114b on the guide rail 111 and the rolling element race tracks 115a, 115b on the slider main body 112A.

Figure 8:
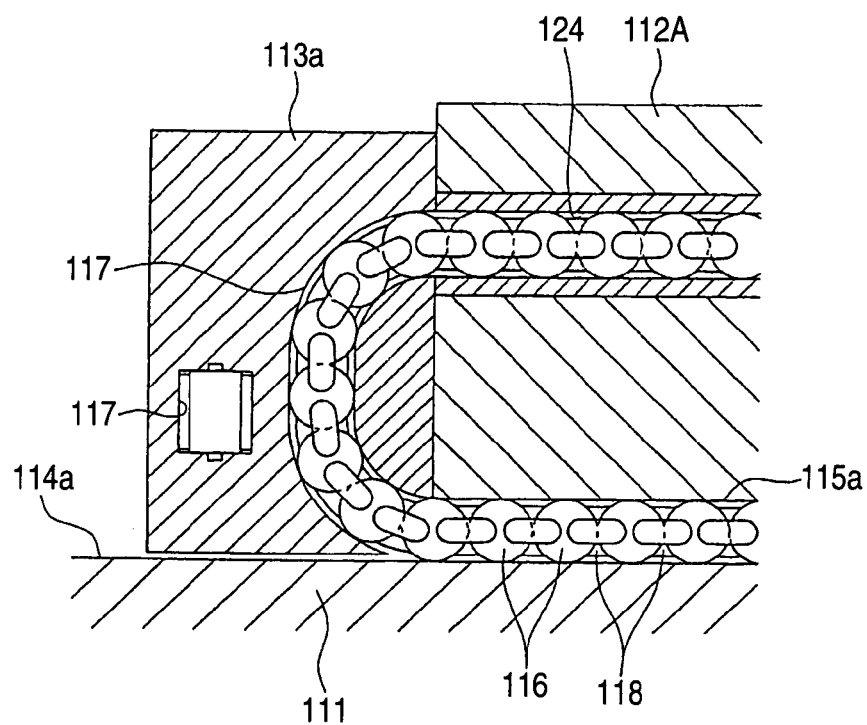
FIG. 8 is a cross-sectional view taken along the line III—III of FIG. 7.
Figure 9:
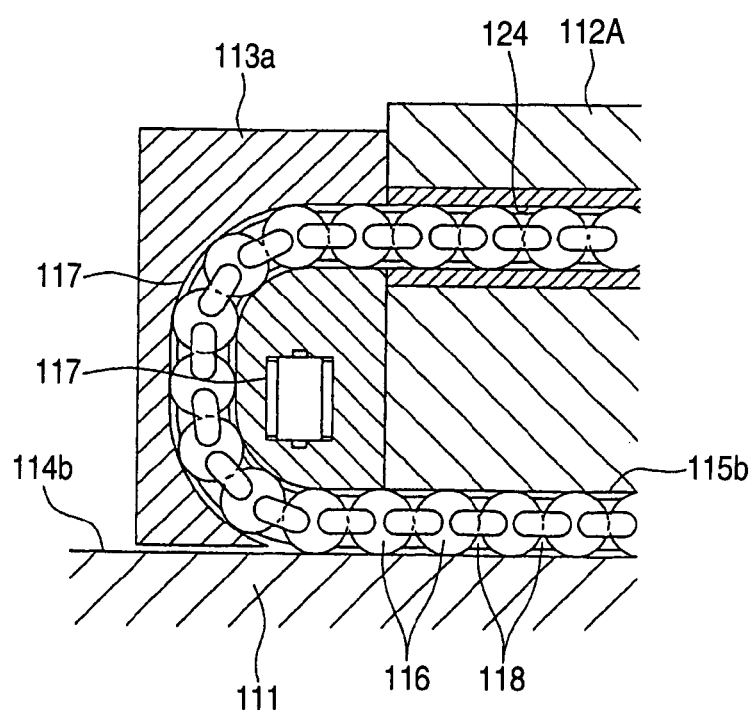
FIG. 9 is a cross-sectional view taken along the line IV—IV of FIG. 7.

The rollers 116 roll between the rolling element race tracks 114a, 114b 111 on the guide rail 111 and the rolling element race tracks 115a, 115b on the slider main body 112A by the relative movement of the slider 112 in the axial direction of the guide rail 111, and then the rollers 116 roll through a rolling element direction reversal path 117 provided in, for example, the end cap 113a (see FIG. 8 and FIG. 9). Meanwhile, the rollers 116 are made of a metal or a ceramic material, and a separator 118 is disposed between each of the rollers 116 (see FIG. 8 and FIG. 9).

Figure 10:
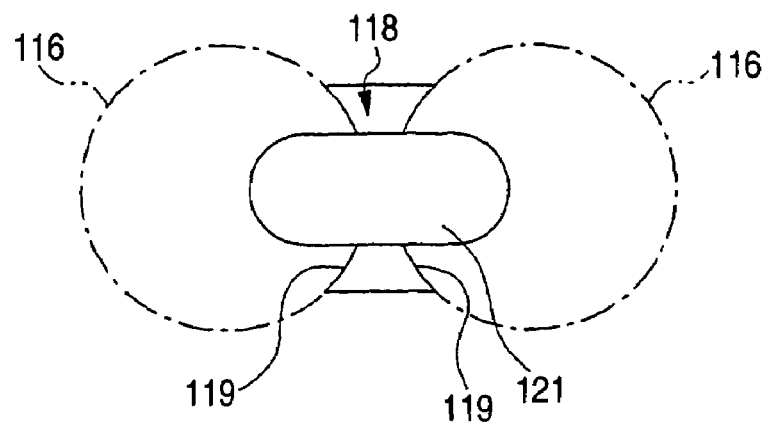
FIG. 10 is a side view showing a separator included in FIG. 8.
Figure 11:
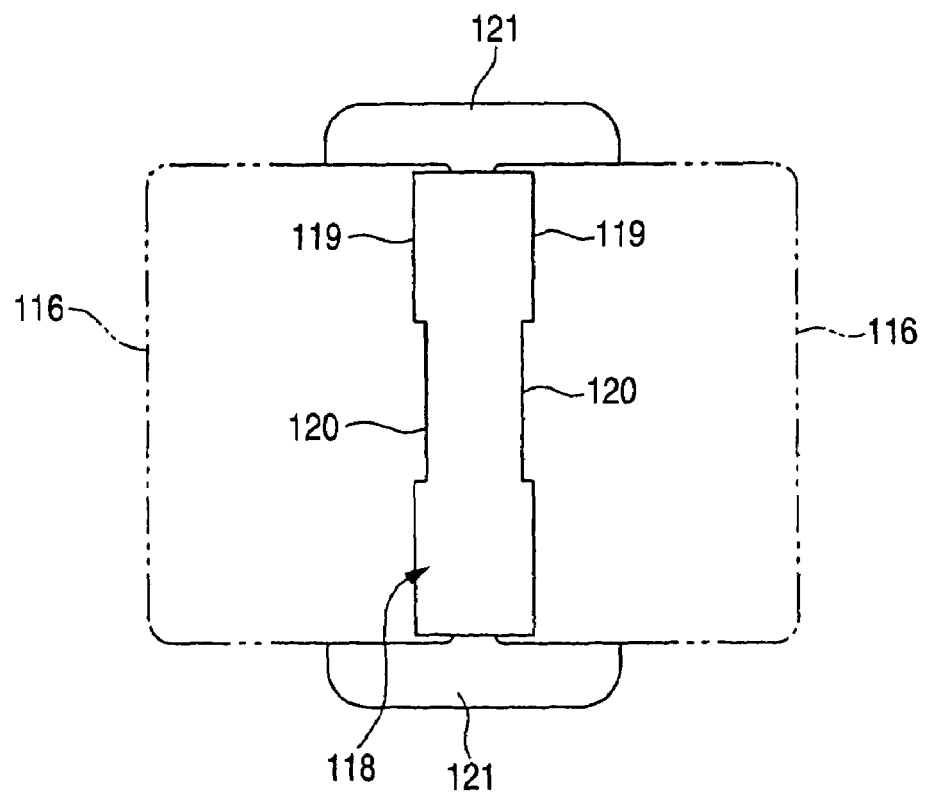
FIG. 11 is a plan view showing the separator of FIG. 10.
Figure 12:
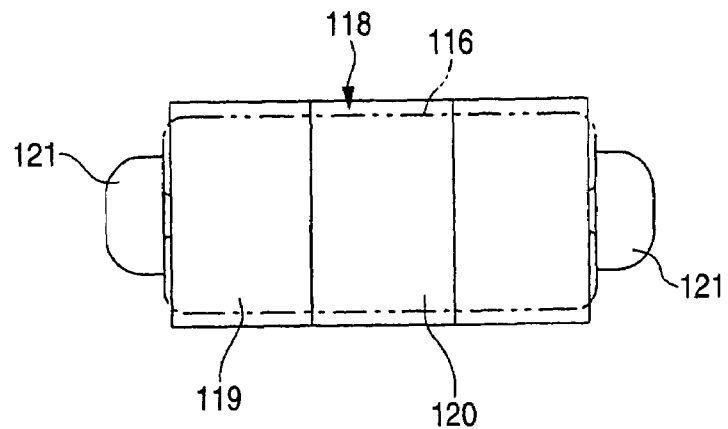
FIG. 12 is a front view showing the separator of FIG. 10.

The separator 118 is provided with a concave rolling element contact surface 119 on front and rear faces thereof, via which to contact with an outer circumferential surface of the rollers 116 as shown in FIG. 10, and a lubricant deposit groove 120 (see FIG. 11 and FIG. 12) for depositing therein a lubricant such as grease is provided at a central portion of the rolling element contact surface 119. Also, the separator 118 is made of a resin, and is provided with an arm member 121 (see FIG. 10 to FIG. 12) extending forward and backward at the respective side faces thereof. The arm member 121 is also made of a resin, and a length thereof is approximately 50 to 98% of a diameter of the roller 116.

The slider main body 112A is provided with block-shaped leg portions 122 (see FIG. 7) so as to oppose the side faces of the guide rail 111, and the respective leg portions 122 are provided with a through hole 123a, 123b having a circular cross-section formed in the axial direction of the guide rail 111. The through holes 123a, 123b are formed in the leg portions 122 in a greater diameter than an axial length of the roller 116, a return passage 124 (see FIG. 8 and FIG. 9) made of a molded resin is disposed in the through holes 123a, 123b. The roller 116 that has rolled through the rolling element direction reversal path 117 in the end cap 113a rolls through the return passage 124, and then through a direction reversal path (not shown) in the end cap 113b, thus to complete a circulation.

Figure 13:
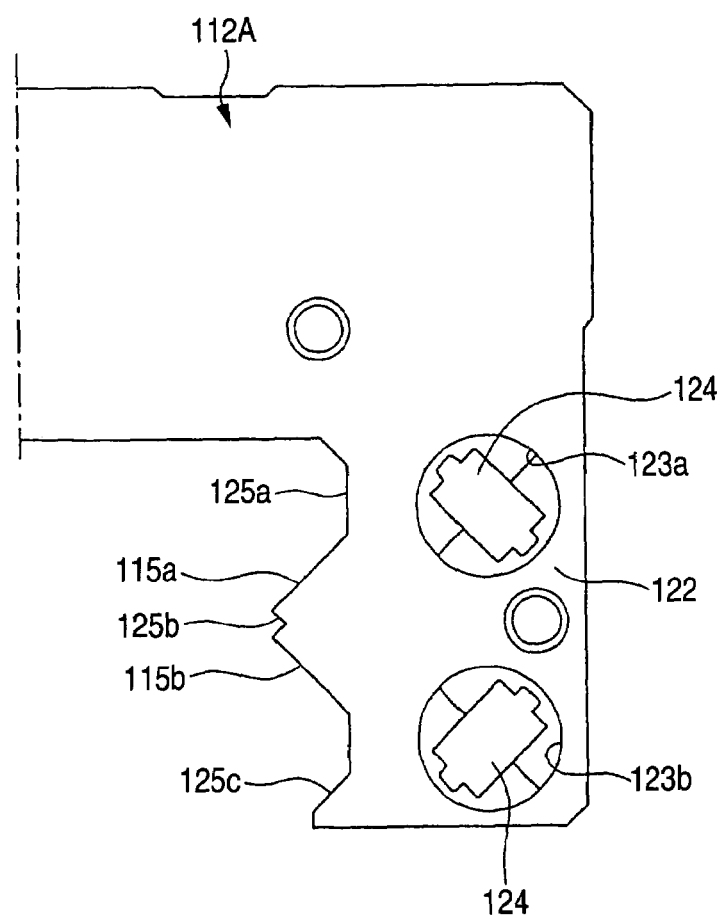
FIG. 13 is a fragmentary front view showing the slider included in FIG. 7.
Figure 14:
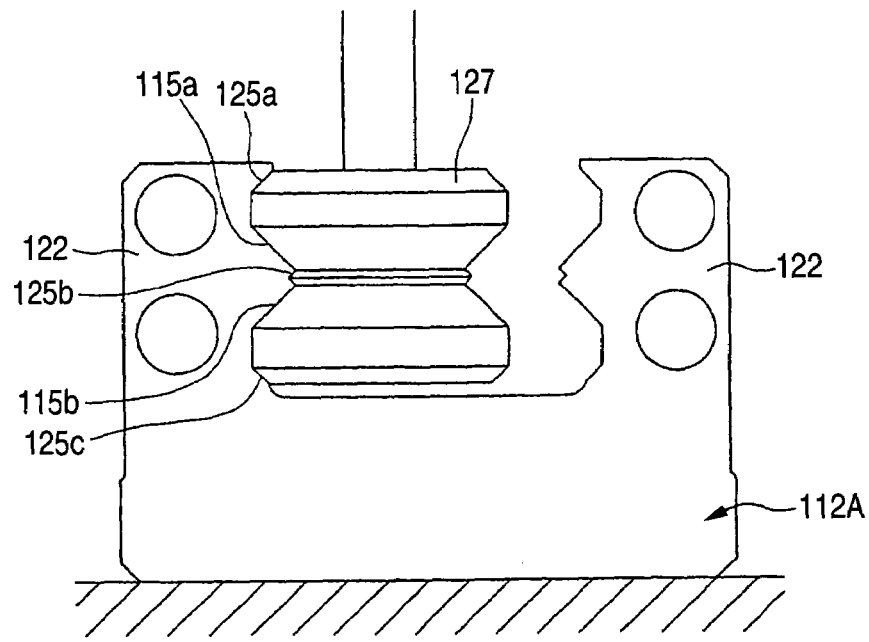
FIG. 14 is a view showing a state of the positioning groove included in FIG. 13 being ground by a grinder.
Figure 15:
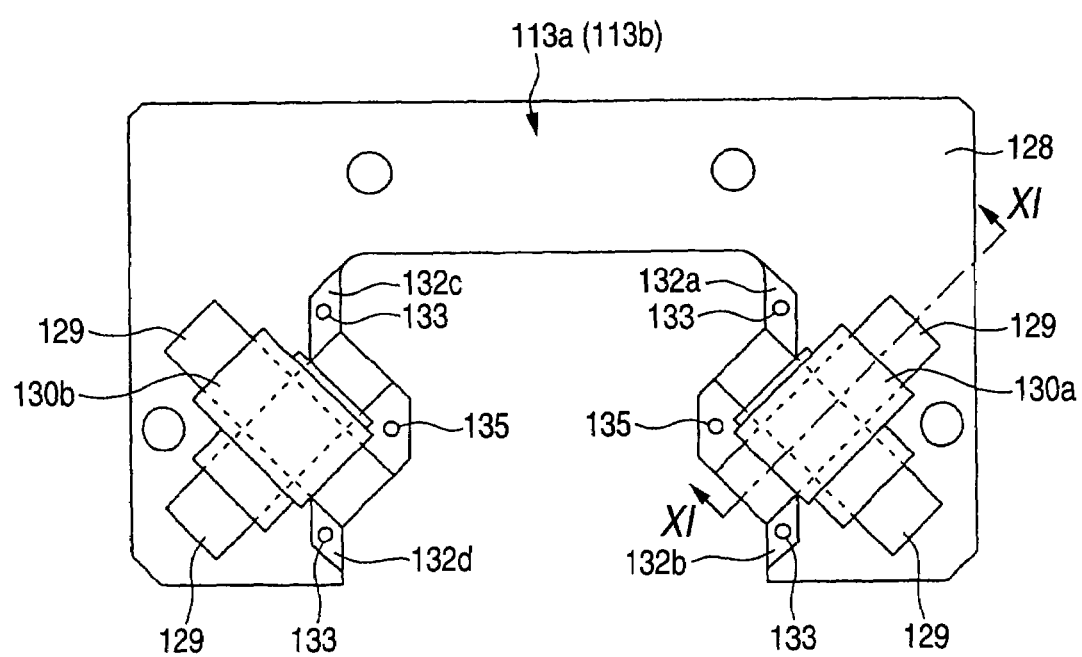
FIG. 15 is a rear view showing the end cap included in FIG. 6.
Figure 16:
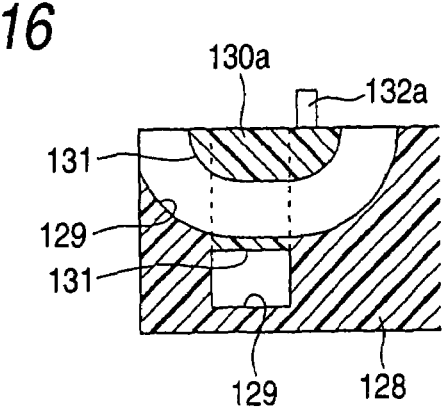
FIG. 16 is a cross-sectional view taken along the line XI—XI of FIG. 15.

Also, the slider main body 112A is provided with positioning grooves 125a to 125c serving as the positioning section, on an inner face of the leg portions 122, as shown in FIG. 13. The positioning grooves 125a to 125c are formed on the inner face of the leg portions 122 in parallel with the rolling element race tracks 115a, 115b on the slider main body 112A, and guide members 126a to 126c (see FIG. 2) for guiding the rollers in the axial direction of the guide rail 111 are positioned along the respective positioning grooves 125a to 125c. Furthermore, among the positioning grooves 125a to 125c, the positioning groove 125b is disposed between the positioning groove 125a formed at an upper position and the positioning groove 125c formed at a lower position. Also shown in FIG. 14, the rolling element race tracks 115a, 115b and the positioning grooves 125a to 125c on the slider main body 112A are simultaneously ground and finished by a single grinder 127.

The end caps 113a, 113b are respectively provided with an end cap main body 128 having an outer direction reversal face 129 for reversing a direction of the roller 116 and a return guide 130a, 130b having an inner direction reversal face 31 (see FIG. 16) opposing the outer direction reversal face 129 of the end cap main body 128. The end cap main body 128 is provided with positioning projections 132a to 132d (see FIG. 15) to be engaged with the positioning grooves 125a or 125c to place the end cap 113a, 113b at a predetermined position. The positioning projections 132a to 132d are formed in an integral body with the end cap main body 128, and each of the positioning projections 132a to 132d is provided with an engaging bore 133 (see FIG. 15) at a tip portion thereof.

The guide members 126a to 126c are formed in a bar shape, among which the guide member 126b fixed in position to the positioning groove 125b has an overall length that is nearly equivalent to that of the slider main body 112A. By contrast, the guide members 126a, 126c respectively fixed in position to the positioning grooves 125a, 125c are slightly shorter than the overall length of the slider main body 112A. The guide members 126a, 126c are provided with a projection 134 (see FIG. 2) at end portions in a longitudinal direction thereof, to be engaged with the engaging bore 133 on the positioning projections 132a to 132d. Furthermore, at the longitudinal end portions of the guide member 126b, a bore 36 (see FIG. 2) to be engaged with a projection 35 (see FIG. 15) formed at a rear face of the end cap 113a, 113b is provided.

Under the foregoing construction, when attaching the end cap 113a, 113b to an end face of the slider main body 112A, insert-fitting the positioning projections 132a to 132d provided on the end cap 113a, 113b into the positioning grooves 125a or 125c formed on an inner face of the slider main body 112A achieves the positioning of the end cap 113a, 113b at a predetermined position with respect to the slider main body 112A.

Accordingly, in the third embodiment described above, since the end cap 113a, 113b can be accurately positioned with respect to the slider main body 112A regardless of the large size error of the guide member 126a to 126c or positioning error of the guide member 126a to 126c to the slider main body 112A, smooth circulation of the rollers 116 can be ensured irrespective of the size error of the guide member 126a to 126c or a similar factor.

Also, according to the third embodiment, since the engaging bore 133 is provided at a tip portion of the positioning projections 132a to 132d and also the projection 134 to be engaged with the engaging bore 133 is provided on the guide member 126a, 126c, the guide member 126a, 126c can be fixed in the positioning groove 125a, 125c of the slider main body 112A without using a bolt or the like, and resultantly the number of components and assembly steps can be reduced.

Referring further to the third embodiment, since the end cap main body 128 is provided with the positioning projections 132a to 132d, relative positioning between the direction reversal path 117 and the rolling element race track 115a, 115b becomes more advantageous; more specifically precise parallelism between the scooping section and the rolling element race track at a cross-section orthogonal to a moving direction of the rollers 116, which is critical in the circulation of the rolling element especially when the rolling element is a roller, and resultantly the rollers 116 can circulate more smoothly.

Figure 17:
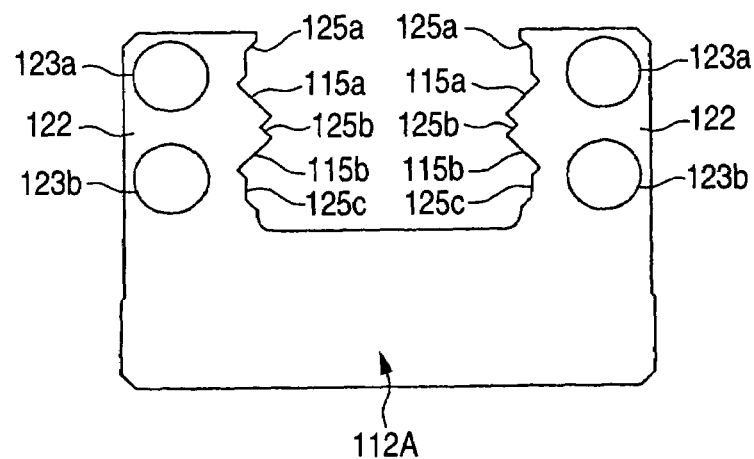
FIG. 17 is a view showing a fourth embodiment of the present invention.

Further, while the engaging bore 133 is provided at a tip portion of the positioning projection 132a to 132d in the third embodiment, it is also preferable to provide the engaging bore 133 at the longitudinal end portions of the guide member 126a, 126c, and the projection 134 to be engaged with the engaging bore 133 at a tip portion of the positioning projection 132a to 132d. Also, the positioning grooves 125a and 125c may be formed in a shape as shown in FIG. 17.

Figure 18:
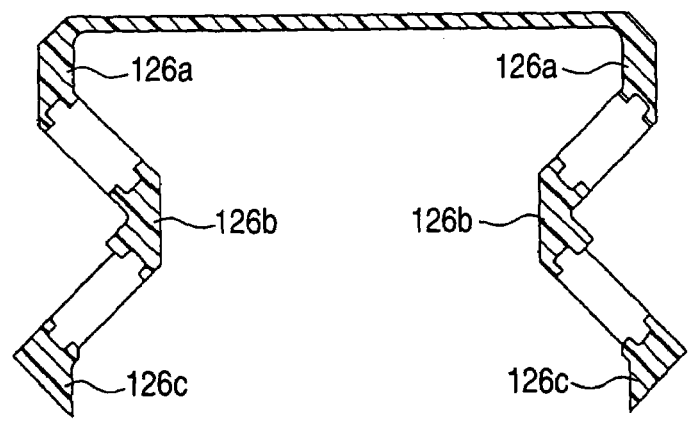
FIG. 18 is a view showing a fifth embodiment of the present invention.
Figure 19:
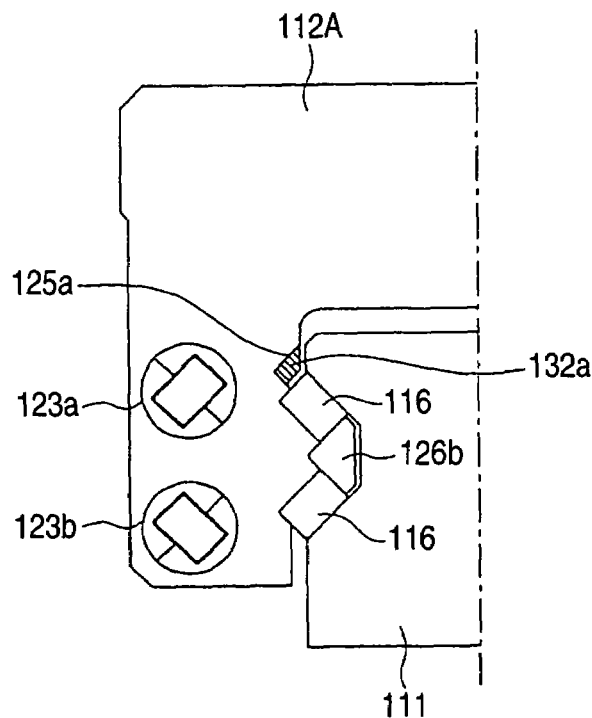
FIG. 19 is a view showing a sixth embodiment of the present invention.
Figure 20:
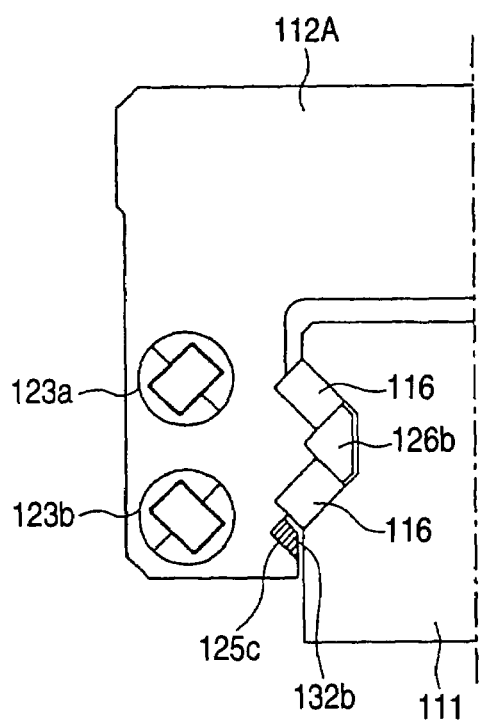
FIG. 20 is view showing a seventh embodiment of the present invention.
Figure 21:
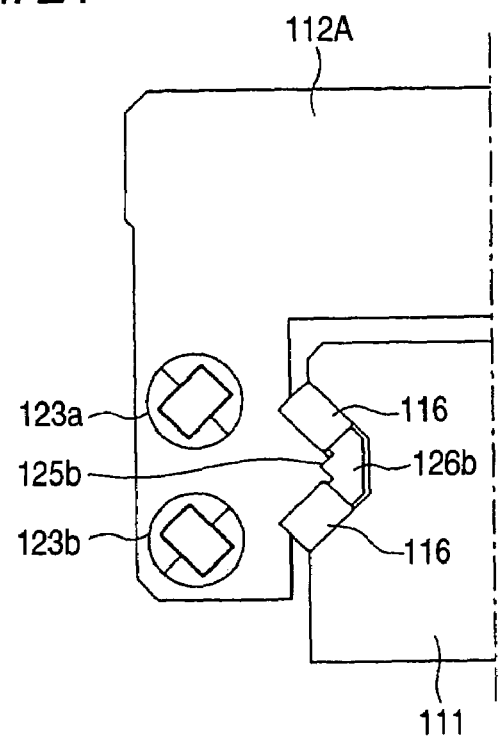
FIG. 21 is a view showing an eighth embodiment of the present invention.
Figure 22:
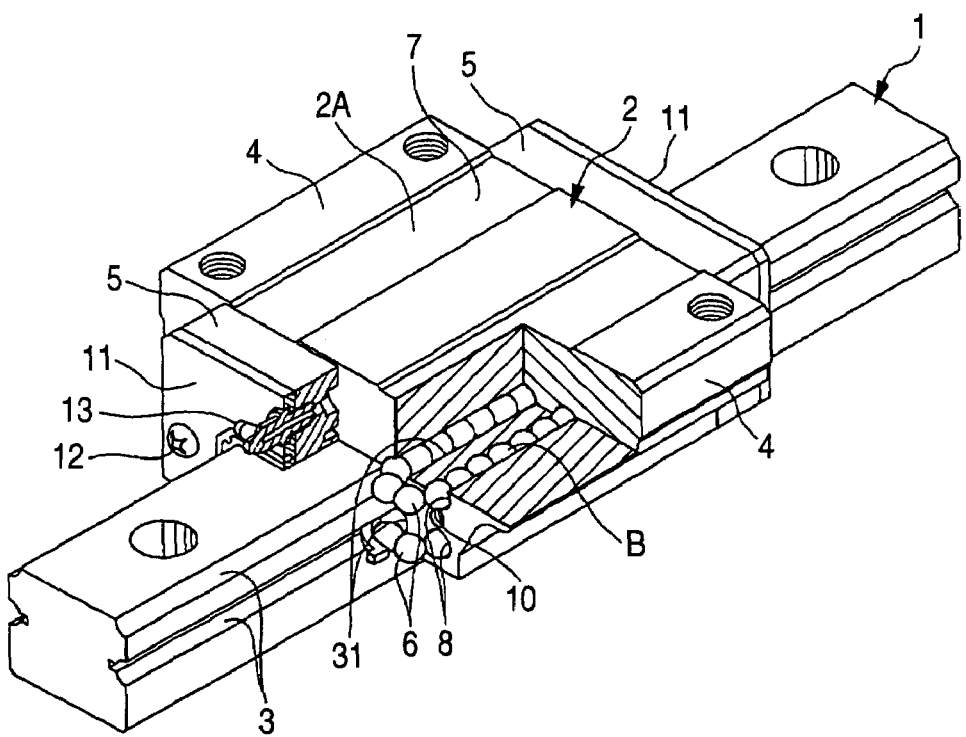
FIG. 22 is a partially cut away perspective view showing a related-art linear guide apparatus.
Figure 23:
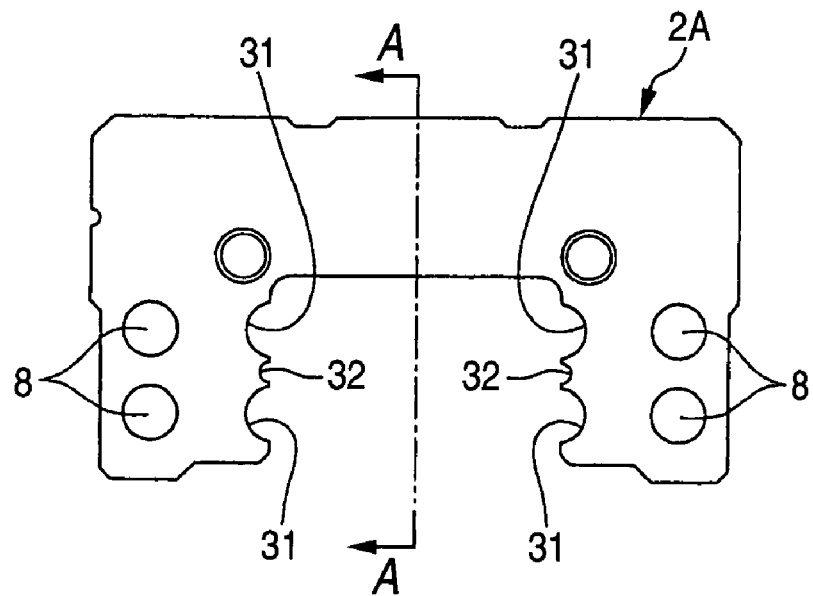
FIG. 23 is a view showing a slider main body with positioning grooves in a related-art.
Figure 24:
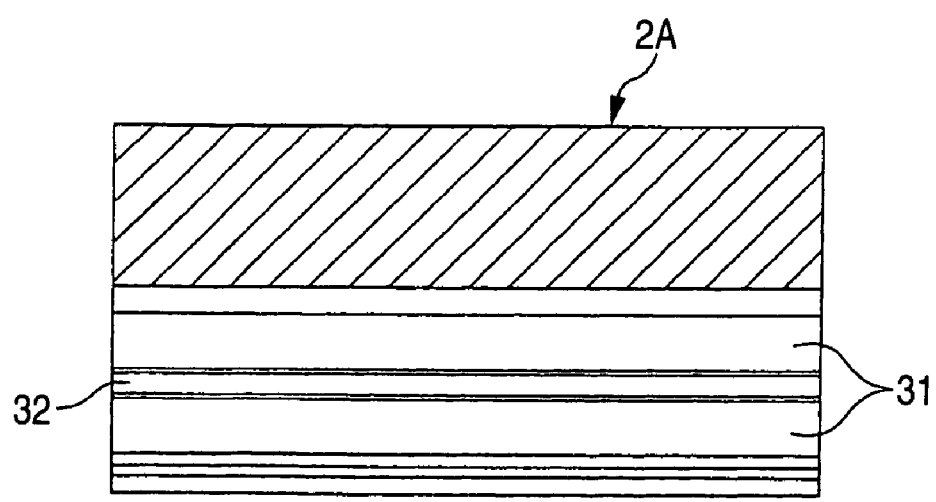
FIG. 24 is a cross-sectional view taken along the line A—A of FIG. 23.
Figure 25:
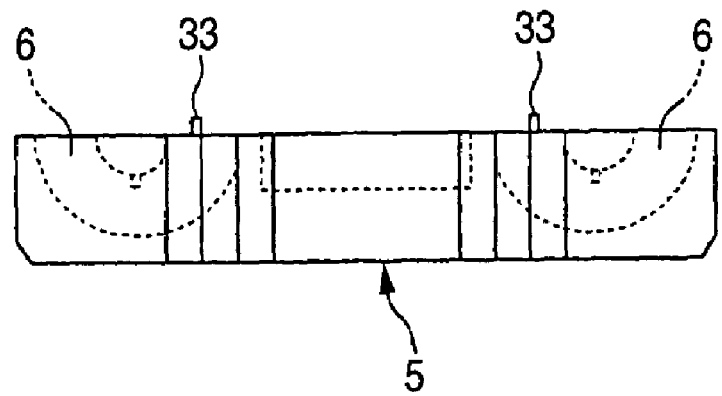
FIG. 25 is a plan view showing an end cap provided with projections for engaging with the relate-art positioning grooves.
Figure 26:
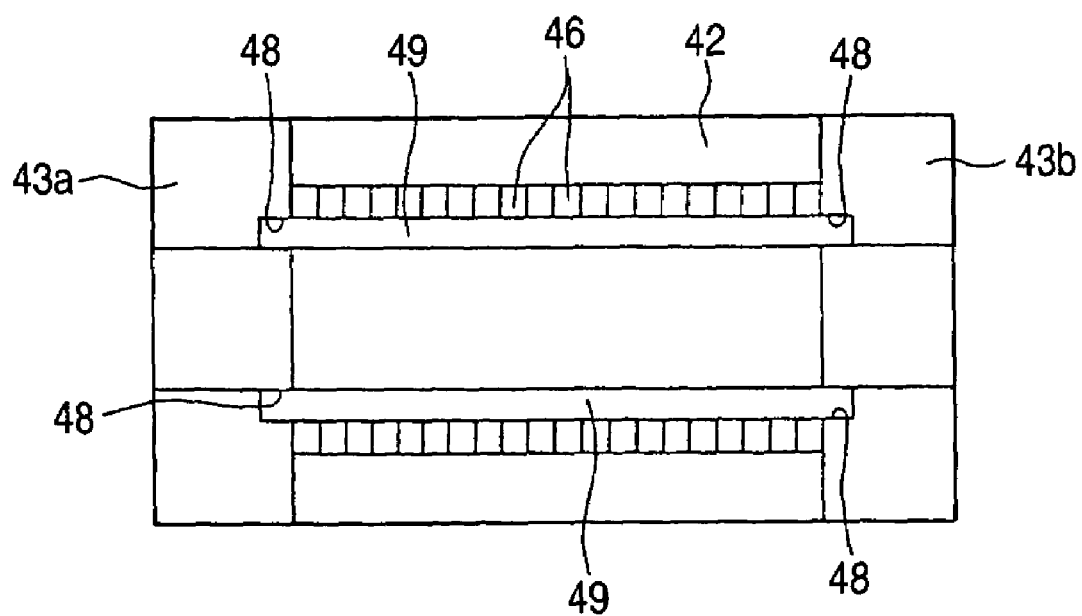
FIG. 26 is a view explaining a related-art linear guide apparatus provided with rollers.

Furthermore, while the guide members 126a to 126c are separately formed in the foregoing embodiments, it is also preferable to form the guide members 126a to 126c in an integral body as shown in FIG. 18. Also, the guide members 126a to 126c may be utilized as a retainer for retaining the rollers 116 on the rolling element race track on the slider main body 112A. Finally, while three positioning grooves are provided on an inner face of the slider main body in the foregoing embodiments, it is also preferable to form a single positioning groove on an inner face of the slider main body 112A as shown in FIG. 19 to FIG. 21.

What is claimed is:

1. A linear guide apparatus comprising:
    a guide rail having a plurality of rolling element race tracks provided on each of side faces of said guide rail; and
    a slider having leg portions disposed widthwise over both sides of said guide rail and a horizontal portion connecting the leg portions, said slider including a slider main body and a pair of end caps respectively fixed to end faces of the slider main body, the slider main body having a plurality of rolling element race tracks, which are provided on an inner face of the respective leg portions of the slider main body so that both of the rolling element race tracks of said guide rail and the slider main body form rolling passages, and a plurality of return passages axially penetrating through the slider main body, the end caps each having a plurality of direction reversal paths communicating with the respective rolling passages and return passages of the slider main body,
    wherein the slider main body has first recesses each of which is provided on the inner face of the respective leg portion and below the rolling element race track close to an end portion of each of the leg portions, and each of the end caps has first projections each of which engages with the first recess so as to determine a position of the end cap.

2. The linear guide apparatus according to claim 1, wherein the slider main body has two rolling element race tracks and two return passages on each of the leg portions.

3. The linear guide apparatus according to claim 2, wherein the first recesses are provided below a respective lower one of the return passages formed on each of the leg portions.

4. The linear guide apparatus according to claim 2, wherein the first recesses are not provided between the return passages formed on each of the leg portions.

5. The linear guide apparatus according to claim 1, wherein the first recess is formed by axially grinding simultaneously with the rolling element race tracks on the slider main body.

* * * * *